Patented Dec. 1, 1931

1,833,941

UNITED STATES PATENT OFFICE

DAVID FALLS, OF BELFAST, IRELAND, ASSIGNOR OF ONE-HALF TO FREDERICK W. HAINES, OF DETROIT, MICHIGAN

PROCESS OF MAKING RUBBER SUBSTITUTE

No Drawing. Application filed June 10, 1927, Serial No. 197,991. Renewed April 17, 1931.

This invention relates to a process for making a rubber substitute and has for its principal object the provision of a rubber substitute that may be utilized for molding articles, with desired variations in their resiliency, as a substitute for raw rubber in the mixes for the manufacture of articles now including rubber, or which may be vulcanized or otherwise heat-treated with additional ingredients to make a substitute patterning after the usual "hard rubber" of commerce.

I have found that by properly combining peat with fullersite, glue and formaldehyde in various proportions, then suitable heating the mixed ingredients, that a substance is obtained that while hot is thickly viscous and which will cool to a solid mass that has many of the properties of the raw rubber of commerce being resilient, pliable and friction-resisting.

In putting my invention into practice I utilize peat, preferably from the lower strata. I have successfully used Irish peat of the quality called by me "black bottoms," which are of inferior grades and ordinarily secured from comparatively great depths in the peat bogs. I also use glue, preferably fish glue, and fullersite, a pulverized slate or slate flour commercially made and sold in Europe and other parts of the world. The glue is first prepared in liquid form of the desired proportion of glue with water, and the finely divided peat is then mixed with the glue and thoroughly stirred therein. The fullersite is then added also in finely divided form and the mixture is again thoroughly stirred. The formaldehyde is then added in varying strengths according to the use to which the mass is to be put after its formation into rubber substitute. After the addition of the formaldehyde the mixture is again stirred. The mixture is then placed in a suitable kettle or mold and heat is applied to bring the mass to a boil and the boiling continued for a suitable time to convert the mixture into a mass of the desired viscosity.

For example, I can use sixteen (16) ounces of aqueous glue solution with thirty (30) ounces of powdered peat, and twelve (12) ounces of powdered fullersite, to which is added six (6) ounces of dilute formaldehyde, the dilution being performed by adding to the commercial formaldehyde an additional one-third quantity of water. This sample mixture would bear a total weight of sixty-four (64) ounces, or four (4) pounds, and the boiling would be continued until its weight is reduced to slightly over three pounds. This is ordinarily accomplished by continuing the boiling for from ten to thirty minutes according the quantity of the mixture being prepared, it being understood that the length of time of boiling is determined by the relative viscosity of the boiling mixture rather than by the weight of the prepared mass.

After the boiling has been concluded, the heated mass is in a thickly viscous state and can be poured directly into molds for cooling into desired shapes, or suitable fillers, coloring matter, etc., can be added to the viscous mass and thoroughly stirred therein preparatory to using the prepared mass as a substitute for commercial rubber. Or if desired, the rubber substitute may be heated in an open mold and then allowed to cool directly in the mold, either by relatively slow cooling or by sudden chilling in suitable liquids. When the prepared mass is allowed to cool slowly in the mold in which it has been heated, or after being poured from the kettle directly into molds, I have found that the rubber substitute is relatively soft throughout possessing comparatively great resiliency, but comparatively little toughness or resistance to friction, while if the molds containing the prepared mass are suddenly chilled the molded articles have a relatively greater toughness, but reduced resiliency. The addition of suitable fillers or other ingredients to the viscous rubber substitute can, of course, be varied to change the softness, toughness, and resiliency of the molded, rolled, or otherwise formed articles as desired.

My improved rubber substitute has been tested in the usual manner of testing commercial rubber and has been found to possess even greater resiliency than commercial rubber, and when treated with suitable fillers, etc., will answer all tests for pliability, toughness, and the like.

Variations in the strength of the formaldehyde used in preparing my improved rubber substitute, and variations in the relative amounts of peat, fullersite and glue used will give rubber substitutes varying in resiliency, toughness, and other characteristics.

Having described my invention, I claim:

1. The process of making a rubber substitute consisting of mixing peat, slate flour, glue and formaldehyde while cold, then heating the mixture.

2. The process of making a rubber substitute, consisting of mixing finely divided peat, finely divided fullersite, glue, and formaldehyde, and then boiling the mixture.

3. The process of making a rubber substitute, consisting of mixing finely divided peat, finely divided slate, liquid glue and dilute formaldehyde while cold and then boiling the mixture until it becomes a thickly viscous mass.

4. The process of making a rubber substitute consisting of mixing finely divided peat with liquid glue while stirring, then stirring finely divided fullersite therein, then stirring in dilute formaldehyde, and finally heating the mixture until it becomes a thickly viscous mass.

5. The process of making a rubber substitute consisting of mixing Irish peat from the lower strata into liquid fish glue by stirring, then stirring finely divided slate therein, then stirring in dilute formaldehyde, then boiling the mixture until it becomes a thickly viscous mass.

6. The process of making a rubber substitute consisting of mixing into a suitable volume of liquid glue finely divided peat to the quantity of substantially double the glue volume, then mixing therein fullersite to the quantity of substantially three-quarters of such glue volume by stirring, then mixing formaldehyde to the quantity of substantially three-eighths of such glue volume into the above mentioned mixture by stirring, and then boiling the entire mixture until it becomes a thickly viscous mass.

7. The process of making a rubber substitute, which consists of stirring into a selected volume of liquid fish glue substantially twice such volume of finely divided peat, then adding substantially three-quarters of such volume of finely divided slate and again stirring, then adding substantially three-eighths of such volume of dilute formaldehyde and again stirring, and then boiling the entire mixture for from ten to thirty minutes.

8. A resilient rubber substitute composed of a mixture of peat, slate flour, fish glue and formaldehyde.

9. A rubber substitute composed of a mixture of Irish peat, fullersite, fish glue and formaldehyde.

In witness whereof I hereunto set my hand.

DAVID FALLS.